United States Patent [19]

Oguino et al.

[11] Patent Number: 4,814,671
[45] Date of Patent: Mar. 21, 1989

[54] CONVERGENCE CIRCUIT

[75] Inventors: Masanori Oguino; Takeo Yamada; Toshiyuki Kimoto, all of Yokohama, Japan

[73] Assignee: Hitachi, Ltd., Tokyo, Japan

[21] Appl. No.: 84,125

[22] Filed: Aug. 12, 1987

[30] Foreign Application Priority Data

Aug. 20, 1986 [JP] Japan .............................. 61-125834[U]

[51] Int. Cl.$^4$ ......................... H01J 29/70; H01J 29/56
[52] U.S. Cl. .................................... 315/368; 315/370
[58] Field of Search ............... 315/368, 370; 358/148, 358/65

[56] References Cited

U.S. PATENT DOCUMENTS 3,953,760  4/1976  Matsuura et al. ................ 315/368
4,631,587  12/1986  Turner ........................... 358/148

Primary Examiner—Theodore M. Blum
Assistant Examiner—Gregory C. Issing
Attorney, Agent, or Firm—Antonelli, Terry & Wands

[57] ABSTRACT

A convergence apparatus in which a sawtooth wave signal having a horizontal period is modulated by a sawtooth wave signal having a vertical period and supplied to a convergence coil to correct misconvergence of rasters on the projection screen, characterized in that the sawtooth wave signal having the horizontal period is derived by integrating a pulse advanced in phase as compared with the flyback pulse by a PPL circuit and hence the distortion of the sawtooth wave signal having the horizontal period exists within a horizontal blanking period.

5 Claims, 2 Drawing Sheets

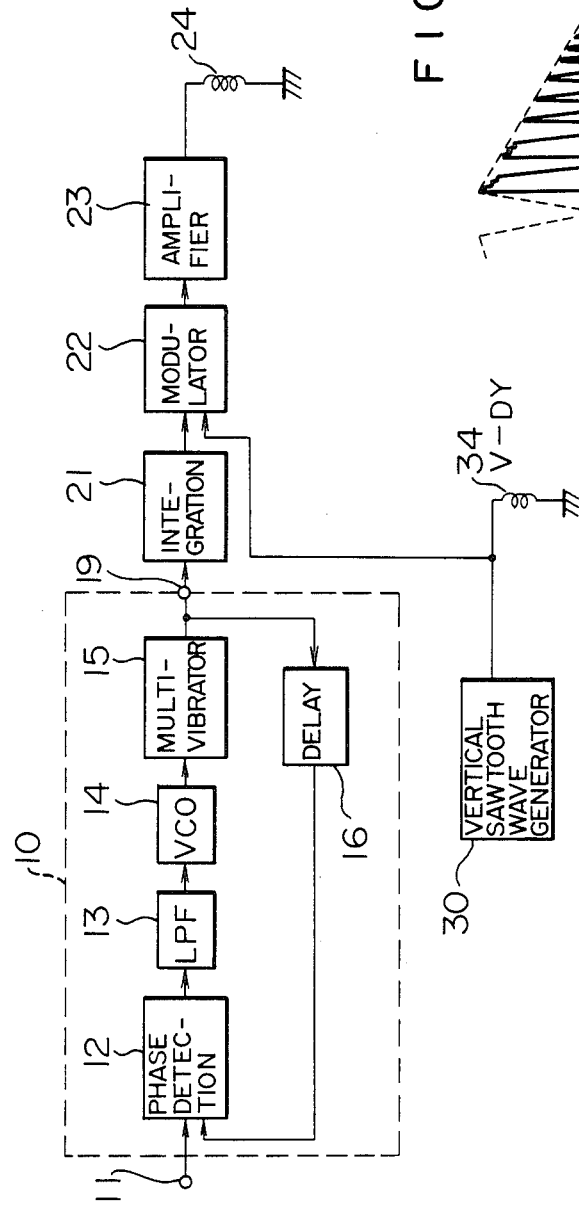
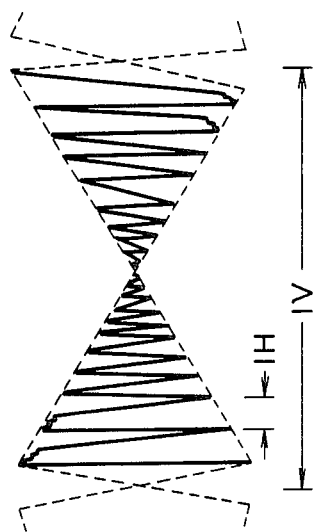

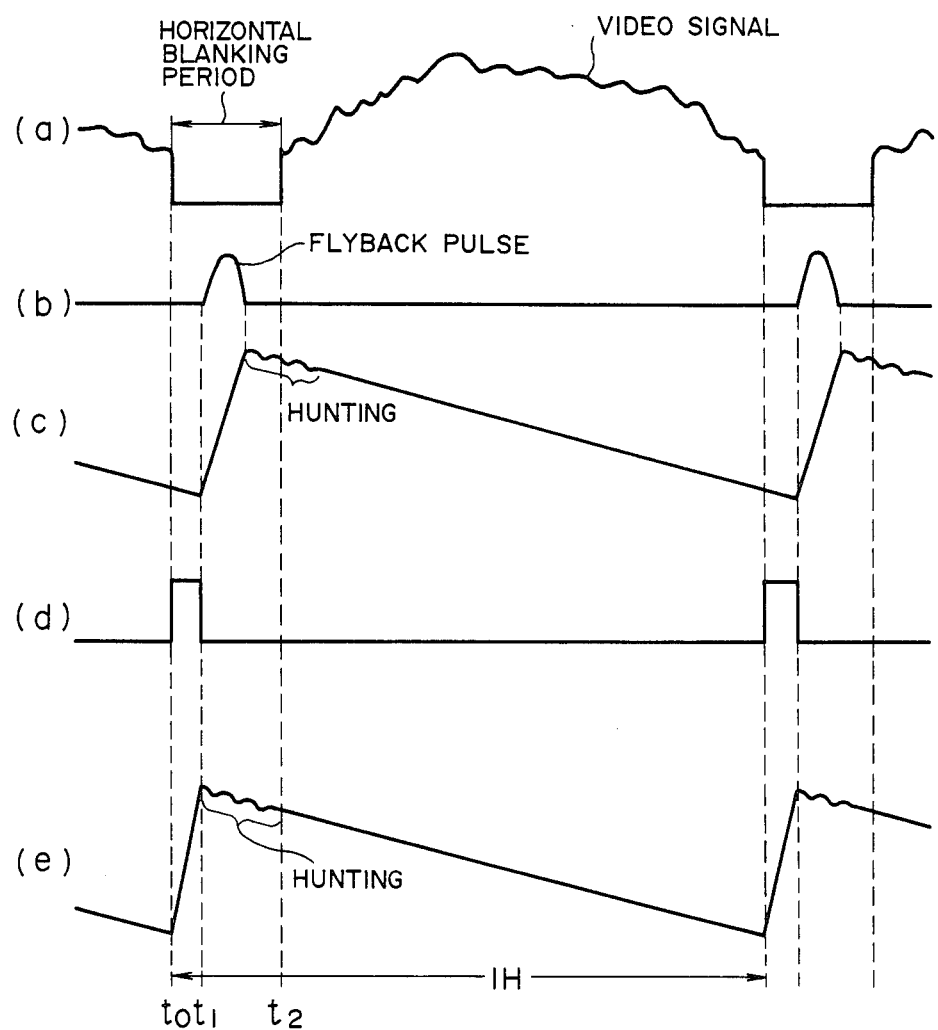

CONVERGENCE CIRCUIT

BACKGROUND OF THE INVENTION

The present invention relates to a convergence apparatus of a color television receiver and in particular to a convergence apparatus in which the abnormality of the screen caused by the saturation of the output of the convergence amplifier is prevented.

In a color television receiver, three primary colors, i.e., red, green and blue are combined on a screen such as a fluorescent screen to produce a color image. In this case, it is important in obtaining a fine picture quality to align three primary colors accurately. Assuming that projection cathode-ray tubes of three primary colors are arranged in the transverse direction in a projection TV receiver, projection angles of projection cathode-ray tubes with respect to respective projection screen differ from each other. Rasters projected onto the screen misconverge color by color. In order to correct this misconvergence, a convergence adjustment coil is disposed in a TV receiver. A sawtooth wave current having a horizontal period modulated by a sawtooth wave signal having a vertical period is supplied to the convergence adjustment coil to effect convergence adjustment. Such a convergence apparatus is described in U.S. Pat. No. 4,318,032.

However, the distortion in the waveform of the correction current and the distortion in raster caused by the voltage saturation in the power supply voltage of a convergence amplifier was not paid attention to at all.

SUMMARY OF THE INVENTION

An object of the present invention is to prevent occurrence of an abnormal raster due to waveform distortion caused by saturation of a convergence output amplifier. In accordance with the present invention, means for advancing the rise timing of the convergence current is disposed. As a result, the waveform distortion generated immediately after the rise of the convergence current occurs during the horizontal blanking period, and hence the waveform distortion does not affect the raster during the display period.

BRIEF DESCRIPTION OF THE DRAWINGS

FIG. 1 is a circuit diagram illustrating an embodiment of the present invention.

FIGS. 2A–E is a waveform diagram illustrating signals appearing at various parts of a convergence apparatus.

FIG. 3 is a waveform diagram of a misconvergence correction current.

DESCRIPTION OF THE PREFERRED EMBODIMENT

FIG. 1 shows a circuit diagram of the present invention. Horizontal flyback pulses as shown in FIG. 2(b) are supplied to an input terminal 11 of a PLL circuit 10, and pulses as shown in FIG. 2(d) are outputted from an output terminal 19. The output pulse is integrated by an integration circuit 21 to produce a sawtooth wave current having a horizontal period. This sawtooth wave current having a horizontal period and a sawtooth wave current having a vertical period fed from a vertical sawtooth wave generator 30 are supplied to a modulator 22 to produce a correction signal for correcting the misconvergence as shown in FIG. 3. This correction current is supplied to an amplifier 23 to be current-amplified.

The resultant current is supplied to a convergence coil 24 disposed at the neck portion of a cathode-ray tube to attain the convergence adjustment.

If the power supply voltage of the amplifier 23 is not sufficiently high, hunting occurs at a portion where the amplitude of the correction current becomes maximum as shown in FIG. 3. Enlarged views of this hunting portion are shown in FIG. 2(c) and (e). In the convergence adjustment apparatus of the prior art, abnormality is caused at the side edges of the screen by this hunting of the correction current.

In the PLL circuit 10 of the present invention circuit, a delay circuit 16 having a delay time $\tau$ is disposed. As the delay circuit 16, not only an analog delay line but also a shift register, for example, may be used. Since the PLL circuit includes the delay circuit 16, the phase of the output signal of a VCO 14 is so varied that the flyback pulse supplied from the outside may have the same phase as the delay signal having the delay time $\tau$ produced by the delay circuit 16. That is to say, the PLL circuit 10 becomes stable under the state that the output signal of the VCO 14 has advanced in phase as compared with the flyback pulse by time $\tau$. At the output terminal 19 of the PLL circuit, therefore, an output pulse which has advanced in phase as compared with the flyback pulse by $\tau$ is obtained. The output pulse of the VCO 14 generally has a duty ratio of 50%. The pulse width is adjusted by a multivibrator 15 to produce a pulse as shown in FIG. 2(d). By choosing the delay time $\tau$ so as to be equal to the difference $(t_1 - t_0)$ between the rise instant $t_1$ of the flyback pulse and the start instant $t_0$ of the horizontal blanking period, the output pulse appearing at the output terminal 19 rises at the instant $t_0$. That is to say, the rise timing of the correction current is advanced from $t_1$ to $t_0$. Accordingly, the hunting portion occurs within the horizontal blanking period (from $t_0$ to $t_2$). As a result, the hunting of the correction current does not cause any abnormality on the screen.

Even if distortion is caused in the misconvergence correction current because the power supply voltage of the amplifier is low, the picture is not affected by this distortion in a convergence apparatus of the present invention heretofore described.

We claim:

1. A convergence apparatus of a display apparatus having a cathode-ray tube, comprising:
    a misconvergence correction coil disposed at the neck portion of the cathode-ray tube;
    PLL means having an input terminal supplied with a flyback pulse and an output terminal for outputting a pulse advanced in phase as compared with said flyback pulse;
    integration means for integrating said pulse advanced in phase and producing a sawtooth wave signal having a horizontal period;
    vertical deflection means for generating a sawtooth wave signal having a vertical period;
    multiplier means supplied with said sawtooth wave signal having the horizontal period and said sawtooth wave signal having the vertical period, said multiplier means multiplying both sawtooth wave signals to produce a misconvergence correction signal; and
    amplifier means for amplifying said misconvergence correction signal and supplying the amplified misconvergence correction signal to said misconvergence correction coil.

2. A convergence apparatus according to claim 1, wherein said PLL means comprises:
- a voltage controlled oscillator having a voltage input terminal and an output terminal connected to said output terminal of said PLL means;
- delay means for producing a delayed signal by delaying an oscillation signal of said voltage controlled oscillator by predetermined time; and
- phase detector means for detecting the phase difference between said flyback pulse supplied to said input terminal and said delayed signal and supplying voltage depending upon the phase difference to said voltage input terminal of said voltage controlled oscillator.

3. A convergence apparatus according to claim 2, wherein the delay time of said delay means is so chosen as to be equal to the time difference between the starting instant of the horizontal blanking period of the TV signal and the rising instant of the flyback pulse.

4. A convergence apparatus according to claim 1, wherein said pulse outputted from said PLL means is advanced in phase as compared with said flyback pulse so as to have a rising instant earlier than a rising instant of said flyback pulse and a falling instant no later than the rising instant of said flyback pulse.

5. A convergence apparatus according to claim 1, wherein said flyback pulse is externally supplied to said input terminal of said PLL means, and said PLL means outputs said pulse advanced in phase as compared with said flyback pulse so as to enable a distortion of said sawtooth wave signal having the horizontal period to exist substantially completely within a horizontal blanking period.

* * * * *